US012630054B2

(12) United States Patent
Lee

(10) Patent No.: US 12,630,054 B2
(45) Date of Patent: May 19, 2026

(54) RESERVOIR TANK FOR INTEGRATED HEAT MANAGEMENT, AND INTEGRATED HEAT MANAGEMENT MODULE COMPRISING SAME

(71) Applicant: HYUNDAI WAI CORPORATION, Gyeongsangnam-do (KR)

(72) Inventor: Sang Min Lee, Gyeonggi-do (KR)

(73) Assignee: HYUNDAI WIA CORPORATION, Gyeongsangnam-Do (KR)

( * ) Notice: Subject to any disclaimer, the term of this patent is extended or adjusted under 35 U.S.C. 154(b) by 507 days.

(21) Appl. No.: 18/019,165

(22) PCT Filed: Aug. 5, 2020

(86) PCT No.: PCT/KR2020/010314
§ 371 (c)(1),
(2) Date: Feb. 1, 2023

(87) PCT Pub. No.: WO2022/030663
PCT Pub. Date: Feb. 10, 2022

(65) Prior Publication Data
US 2023/0311707 A1      Oct. 5, 2023

(51) Int. Cl.
*B60L 58/26* (2019.01)
*B60K 11/04* (2006.01)
*F01P 11/02* (2006.01)

(52) U.S. Cl.
CPC .............. B60L 58/26 (2019.02); B60K 11/04 (2013.01); F01P 11/029 (2013.01)

(58) Field of Classification Search
CPC ......... B60L 58/26; B60K 11/04; F01P 11/029

USPC ......................................................... 220/501
See application file for complete search history.

(56) References Cited

U.S. PATENT DOCUMENTS

| | | | |
|---|---|---|---|
| 2015/0280281 A1* | 10/2015 | Farmer ................... | B60L 50/64 |
| | | | 429/188 |
| 2016/0222869 A1 | 8/2016 | Nishiguchi et al. | |
| 2020/0031191 A1* | 1/2020 | Oh ...................... | B60H 1/00899 |
| 2020/0274210 A1* | 8/2020 | Bae ........................ | H01M 10/63 |
| 2021/0001686 A1* | 1/2021 | Kim ................... | B60H 1/00921 |

FOREIGN PATENT DOCUMENTS

| | | |
|---|---|---|
| CN | 102224330 A | 10/2011 |
| CN | 202441476 U | 9/2012 |
| CN | 104602943 A | 5/2015 |
| KR | 1020110051829 | 5/2011 |
| KR | 10-1448656 | 10/2014 |
| KR | 20160048237 A | 5/2016 |
| KR | 1020180136633 | 12/2018 |
| KR | 10-1934360 | 3/2019 |

(Continued)

*Primary Examiner* — Rafael A Ortiz
*Assistant Examiner* — Niki M Eloshway
(74) *Attorney, Agent, or Firm* — Dickinson Wright PLLC

(57)      ABSTRACT

A reservoir tank for integrated heat management, the reservoir tank having a first reservoir part, connected to an electric parts line connected to an electric parts core, for storing therein cooling fluid flowing into and out of the electric parts line, as well as a second reservoir part, connected to a battery line connected to a high-voltage battery core, for storing therein cooling fluid flowing into and out of the battery line, separated from the cooling fluid stored in the first reservoir part.

11 Claims, 5 Drawing Sheets

(56)          References Cited

FOREIGN PATENT DOCUMENTS

| KR | 10-2189058 | 12/2020 | |
| WO | WO-2019176494 A1 * | 9/2019 | ............. B60K 11/02 |
| WO | WO-2020129259 A1 * | 6/2020 | ............ B60L 53/302 |
| WO | WO-2020160656 A1 * | 8/2020 | .............. B60K 1/00 |
| WO | WO-2020182568 A2 * | 9/2020 | .......... F01P 11/0214 |

* cited by examiner

FIG. 2

RESERVOIR TANK FOR INTEGRATED HEAT MANAGEMENT, AND INTEGRATED HEAT MANAGEMENT MODULE COMPRISING SAME

CROSS REFERENCE TO RELATED APPLICATION

This application is a 35 U.S.C. § 371 national phase of PCT International Application No. PCT/KR2020/010314, filed Aug. 5, 2020, the contents of which is incorporated herein by reference in its entirety.

BACKGROUND

Field

The present disclosure relates to a reservoir tank for integrated heat management and an integrated heat management module including the same and, more particularly, to a reservoir tank configured to integrally store cooling water supposed to flow to a battery line and cooling line supposed to flow to an electronic equipment component line.

Description of the Related Art

Electric cars have recently emerged as social issues in order to implement eco-friendly technologies and to deal with energy depletion and other problems. Electric cars operate by using motors which receive electricity from batteries and output power. Electric cars are thus eco-friendly because they discharge no carbon dioxide, generate negligible noise, and their motors have higher energy efficiency than that of engines.

Technologies regarding battery modules are essential to implementing such electric cars, and there has recently been extensive research in connection with making batteries lightweight and compact and reducing the charging time. Battery modules need to be used in optimal temperature environments such that optical performance and long lifespan can be maintained. However, heat generated during driving and external temperature changes make it difficult to use the same in optimal temperature environments.

An integrated heat management system has recently been constructed such that such a battery cooling/heating system is integrated and operated together with an air-conditioning system for vehicle indoor air conditioning. However, the prior art has a problem in that heat management of a battery and that of an electronic equipment component, which need to be controlled in different temperature ranges, affect each other, thereby making it difficult to independently control the same.

Relevant prior art documents include Registered Korean Patent No. 10-1448656 B1.

The above descriptions regarding background technologies have been made only to help understanding of the background of the present disclosure, and are not to be deemed by those skilled in the art to correspond to already-known prior arts.

SUMMARY OF THE DISCLOSURE

The present disclosure has been proposed to solve the above-mentioned problems, and may provide a reservoir tank for integrated heat management and an integrated heat management module including the same, wherein a single integrated reservoir tank and devices integrated therewith are used and can be independently controlled for heat management.

In order to solve the above-mentioned problems, a reservoir tank for integrated heat management according to the present disclosure includes: a first reservoir part connected to an electronic equipment component line connected to an electronic equipment component core such that cooling water flowing into/out of the electronic equipment component line is stored in the first reservoir part; and a second reservoir part connected to a battery line connected to a high-voltage battery core such that cooling water flowing into/out of the battery line is stored in the second reservoir part separately from the cooling water stored in the first reservoir part.

The reservoir tank for integrated heat management may further include a separator barrier extending upwards from the lower surface of the reservoir tank between the first reservoir part and the second reservoir part so as to delimit the first reservoir part and the second reservoir part.

The reservoir tank for integrated heat management may further include an injection barrier formed in the first reservoir part or the second reservoir part so as to extend along a plane parallel to the ground.

The first reservoir part and the second reservoir part may communicate with each other in the upper portion of the injection barrier, and a through-hole may be formed through the injection barrier such that the upper and lower portions of the injection barrier communicate with each other.

The reservoir tank for integrated heat management may further include an injection opening formed through a wall of the reservoir tank such that the first reservoir part and the second reservoir part communicate with each other in the upper portion thereof, and such that the inside of the first reservoir part and the second reservoir part communicates with the outside.

The first reservoir part may have a first inflow opening formed such that cooling water flows in from the electronic equipment component line and may have a first discharge opening formed such that cooling water therein is discharged to the electronic equipment component line, the first inflow opening may be positioned in the lower portion of the injection barrier, and the first discharge opening maybe positioned relatively lower than the first inflow opening.

The second reservoir part may have a second inflow opening formed such that cooling water flows in from the battery line and may have a second discharge opening formed such that cooling water therein is discharged to the battery line, the second inflow opening may be positioned in the lower portion of the injection barrier, and the second discharge opening may be positioned relatively lower than the second inflow opening.

In order to solve the above-mentioned problems, an integrated heat management module including the reservoir tank for integrated heat management may further include: a chiller directly or indirectly coupled so as to be integrally connected to the reservoir tank such that refrigerant and cooling water, which flow in/out, respectively, exchange heat with each other; a first pump connected to a first discharge opening through which cooling water is discharged from the first reservoir part so as to circulate cooling water through the electronic equipment component line; a first valve configured to adjust cooling water in the first reservoir part and cooling water that has passed through the chiller so as to selectively flow into the first pump; a second pump connected to a second discharge opening through which cooling water is discharged from the second reservoir part so as to circulate cooling water through the battery line; and a second valve configured to adjust cooling water in the second reservoir part and cooling water that has passed through the chiller so as to selectively flow into the second pump.

The chiller may be formed such that cooling water flows therein from the electronic equipment component line and cooling water flows therein from the battery line while being separated from each other.

The integrated heat management module may further include: a first branch tube branching off between a first radiator and the chiller such that cooling water flows in from the electronic equipment component line after passing through the electronic equipment core; and a second branch tube branching off between a second radiator and the chiller such that cooling water flows in from the battery line after passing through the high-voltage battery core, and the first branch tube and the second branch tube may be integrally coupled to the chiller or the reservoir tank.

The integrated heat management module may further include: a first discharge line extending between the chiller and the first valve such that cooling water in the electronic equipment component line, discharged from the chiller, flows into the first valve; and a second discharge line extending between the chiller and the second valve such that cooling water in the battery line, discharged from the chiller, flows into the second valve, and the first discharge line and the second discharge line may be integrally coupled to the chiller or the reservoir tank.

The first pump and the second pump may be integrally coupled to the chiller or the reservoir tank, and the direction in which the first pump rotates during driving is opposite to the direction in which the second pump rotates during driving.

The integrated heat management module may further include a controller integrally coupled to the first pump and the second pump so as to control driving of the first pump and driving of the second pump together.

A reservoir tank for integrated heat management and an integrated heat management module including the same, according to the present disclosure, are advantageous in that a single reservoir tank includes a first reservoir part and a second reservoir part having spaces separated from each other such that manufacturing costs can be reduced, while providing packaging efficiency.

There is another advantage in that refrigerant is heated by using waste heat from cooling water heated by a high-voltage battery or an electronic equipment component, thereby improving overall energy efficiency of the integrated cooling circuit.

BRIEF DESCRIPTION OF THE DRAWINGS

FIG. 2 is an A-A sectional view of the reservoir tank for integrated heat management according to an embodiment of the present disclosure.

DETAILED DESCRIPTION

Figure 1:
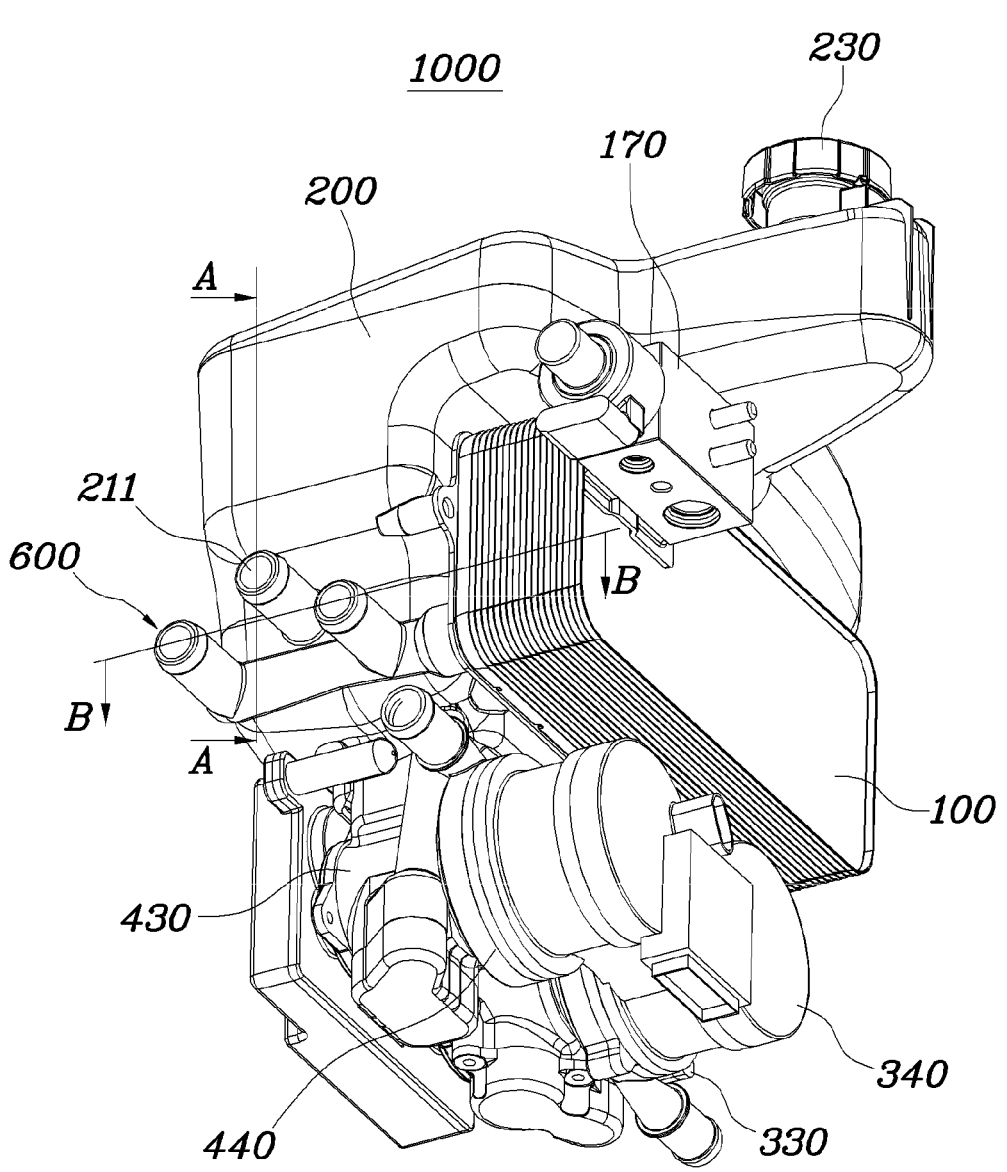
FIG. 1 is a perspective view of an integrated heat management module including a reservoir tank for integrated heat management according to an embodiment of the present disclosure.

A specific structural or functional description of embodiments of the present disclosure set forth in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. Similar or like reference signs presented in the respective drawings designate similar or like elements.

Figure 2:
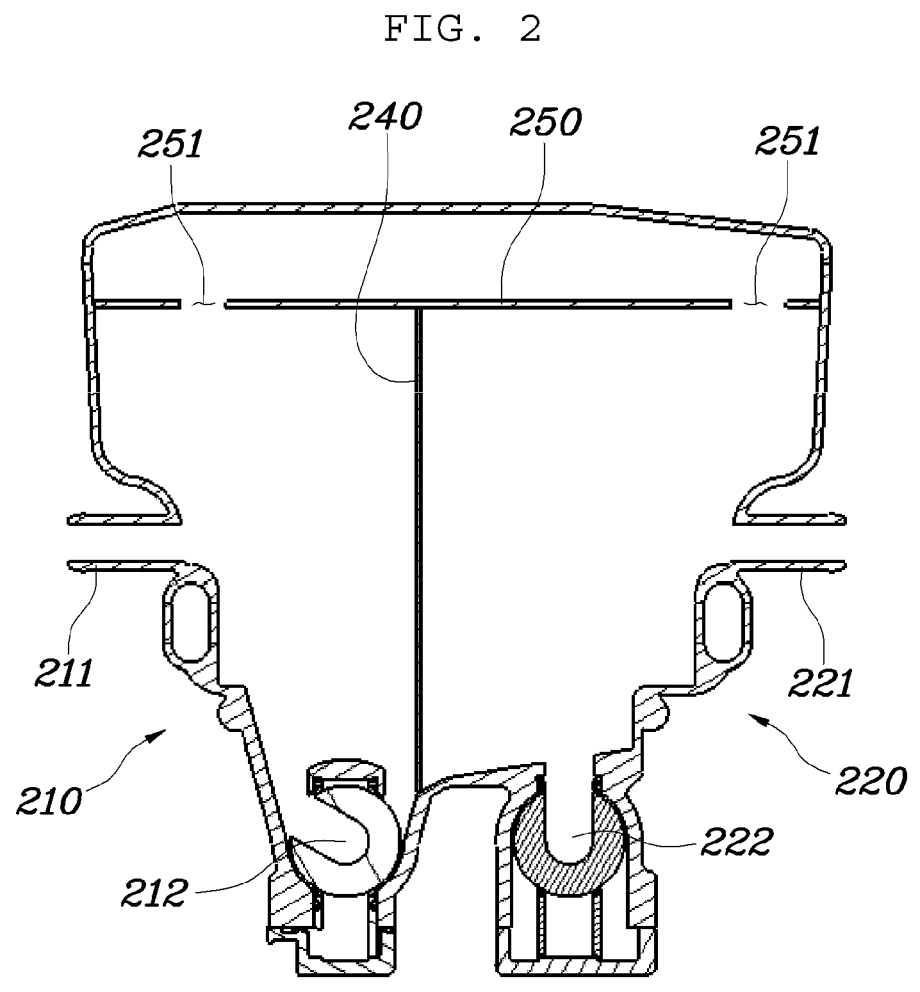

FIG. 1 is a perspective view of an integrated heat management module 1000 including a reservoir tank 200 for integrated heat management according to an embodiment of the present disclosure, and FIG. 2 is an A-A sectional view of the reservoir tank 200 for integrated heat management according to an embodiment of the present disclosure.

Referring to FIG. 1 and FIG. 2, the reservoir tank 200 for integrated heat management according to an embodiment of the present disclosure includes: a first reservoir part 210 connected to an electronic equipment component line 300 connected to an electronic equipment component core 310 so as to store cooling water flowing into/out of the electronic equipment component line 300 therein; and a second reservoir part 220 connected to a battery line 400 connected to a high-voltage battery core 410 so as to store cooling water flowing into/out of the battery line 400 therein while separately from the cooling water stored in the first reservoir part 210.

The reservoir tank 200 of the present disclosure may be case surrounded by walls such that a space is formed therein. The reservoir tank 200 may include a first reservoir part 210 and the second reservoir part 220.

The first reservoir part 210 may be connected such that cooling water flows into/out of the electronic equipment component line 300, and the second reservoir part 220 may be connected such that cooling water flows into/out of the battery line 400. Particularly, the electronic equipment component line 300 for cooling an electronic equipment component and the battery line 400 for cooling a high-voltage battery need to maintain different temperatures, and the temperature of cooling water thus needs to be controlled differently.

The first reservoir part 210 and the second reservoir part 220 may have inner spaces separated from each other such that cooling water stored in each inner space is prevented from mixing or exchanging heat with each other.

As such, a single reservoir tank 200 includes a first reservoir part 210 and a second reservoir part 220 having spaces separated from each other. This is advantageous in that manufacturing costs can be reduced while providing packaging efficiency.

Particularly, the reservoir tank 200 may further include a separator barrier 240 extending upwards from the lower surface thereof between the first reservoir part 210 and the second reservoir part 220 so as to delimit the first reservoir part 210 and the second reservoir part 220.

The separator barrier 240 may be formed to extend upwards from the lower surface of the reservoir tank 200 so as to delimit the first reservoir part 210 and the second reservoir part 220 and to separate the inner space therebetween.

Accordingly, cooling water stored in the first reservoir part 210 and cooling water stored in the second reservoir part 220 may be prevented from mixing with each other.

In another embodiment, the first reservoir part 210 and the second reservoir part 220 may be separated so as to form an empty space extending in the upward/downward direction between the first reservoir part 210 and the second reservoir part 220. This embodiment is advantageous in that heat exchange between the first reservoir part 210 and the second reservoir part 220 is prevented as well.

The reservoir tank 200 may further include an injection barrier 250 formed in the first reservoir part 210 or the second reservoir part 220 so as to extend along a plane parallel to the ground.

Particularly, the injection barrier 250 may be formed in the upper portion of the inside of the reservoir tank 200 and may extend through all of the first reservoir part 210 and the second reservoir part 220. In an embodiment, the injection barrier 250 may extend laterally from the upper end of the separator barrier 240 described above so as to extend from the first reservoir part 210 and the second reservoir part 220 to the inner surface of the reservoir tank 200.

This is advantageous in that the injection barrier 250 can reduce the flow of cooling water stored in the first reservoir part 210 and the second reservoir part 220, and can particularly block the flow of cooling water flowing in through an inflow opening.

In addition, the first reservoir part 210 and the second reservoir part 220 may communicate with each other in the upper portion of the injection barrier 250, and a through-hole 251 may be formed through the injection barrier 250 such that the upper and lower portions of the injection barrier 250 communicate with each other.

The injection barrier 250 may be positioned in the upper portions of the first reservoir part 210 and the second reservoir part 220, and the first reservoir part 210 and the second reservoir part 220 may communicate with each other in the upper portion of the injection barrier 250. An empty space filled with air may be formed in the upper portion of the injection barrier 250, and cooling water in the first reservoir part 210 and the second reservoir part 220 may partially fill up to the upper portion of the injection barrier 250.

A through-hole 251 may be formed through the injection barrier 250 which splits the first reservoir part 210 and the second reservoir part 220 in the upward/downward direction. The through-hole 251 may enable the upper and lower portions of the injection barrier 250 to communicate with each other, and cooling water may thus partially move between the first reservoir part 210 and the second reservoir part 220 so as to naturally compensate for lack of cooling water therebetween.

This is advantageous in that, even without separately injecting cooling water or manipulating the movement of cooling water, the movement of cooling water between the first reservoir part 210 and the second reservoir part 220 inside the reservoir tank 200 naturally compensates for lack of cooling water.

The reservoir tank 200 may further include an injection opening 230 formed through the wall thereof such that the first reservoir part 210 and the second reservoir part 220 communicate with each other in the upper portion thereof, and such that the inside of the first reservoir part 210 and the second reservoir part 220 communicates with the outside.

The injection opening 230 may be positioned in the upper portion of the injection barrier 250 so as to communicate both with the first reservoir part 210 and with the second reservoir part 220. Cooling water may be supplemented to the outside through the injection opening 230, and the supplemented cooling water may replenish the first reservoir part 210 and the second reservoir part 220 through the through-hole 251 in the upper portion of the injection barrier 250.

This is advantageous in that, even if cooling water is supplemented through a single injection opening 230, both the first reservoir part 210 and the second reservoir part 220 is replenished with cooling water, and cooling water is naturally distributed or supplemented between the first reservoir part 210 and the second reservoir part 220.

The first reservoir part 210 may have a first inflow opening 211 formed therein such that cooling water flows in from the electronic equipment component line 300 and may have a first discharge opening 212 formed therein such that cooling water therein is discharged to the electronic equipment component line 300. The first inflow opening 211 may be positioned in the lower portion of the injection barrier 250. The first discharge opening 212 may be positioned relatively lower than the first inflow opening 211.

The second reservoir part 220 may have a second inflow opening 221 formed therein such that cooling water flows in from the battery line 400 and may have a second discharge opening 222 formed therein such that cooling water therein is discharged to the battery line 400. The second inflow opening 221 may be positioned in the lower portion of the injection barrier 250. The second discharge opening 222 may be positioned relatively lower than the second inflow opening 221.

The first inflow opening 211 and the second inflow opening 221 may be formed in the lower portion of the injection barrier 250 in the first reservoir part 210 and the second reservoir part 220, respectively, and cooling water may flow therein from the electronic equipment component line 300 or from the battery line 400, respectively. Cooling water that has flowed in through the first inflow opening 211 and the second inflow opening 221 may be prevented from flowing by the lower portion of the injection barrier 250.

In addition, the first discharge opening 212 and the second discharge opening 222 may be positioned lower than the first inflow opening 211 and the second inflow opening 221. Particularly, the first discharge opening 212 and the second discharge opening 222 may be formed in the lower portion of the first reservoir part 210 and the second reservoir part 220, respectively.

This is advantageous in that cooling water is discharged from the first reservoir part 210 and the second reservoir part 220 after bubbles are removed therefrom, and cooling water can be discharged to the largest extent even if the first reservoir part 210 or the second reservoir part 220 lacks cooling water.

Figure 3:
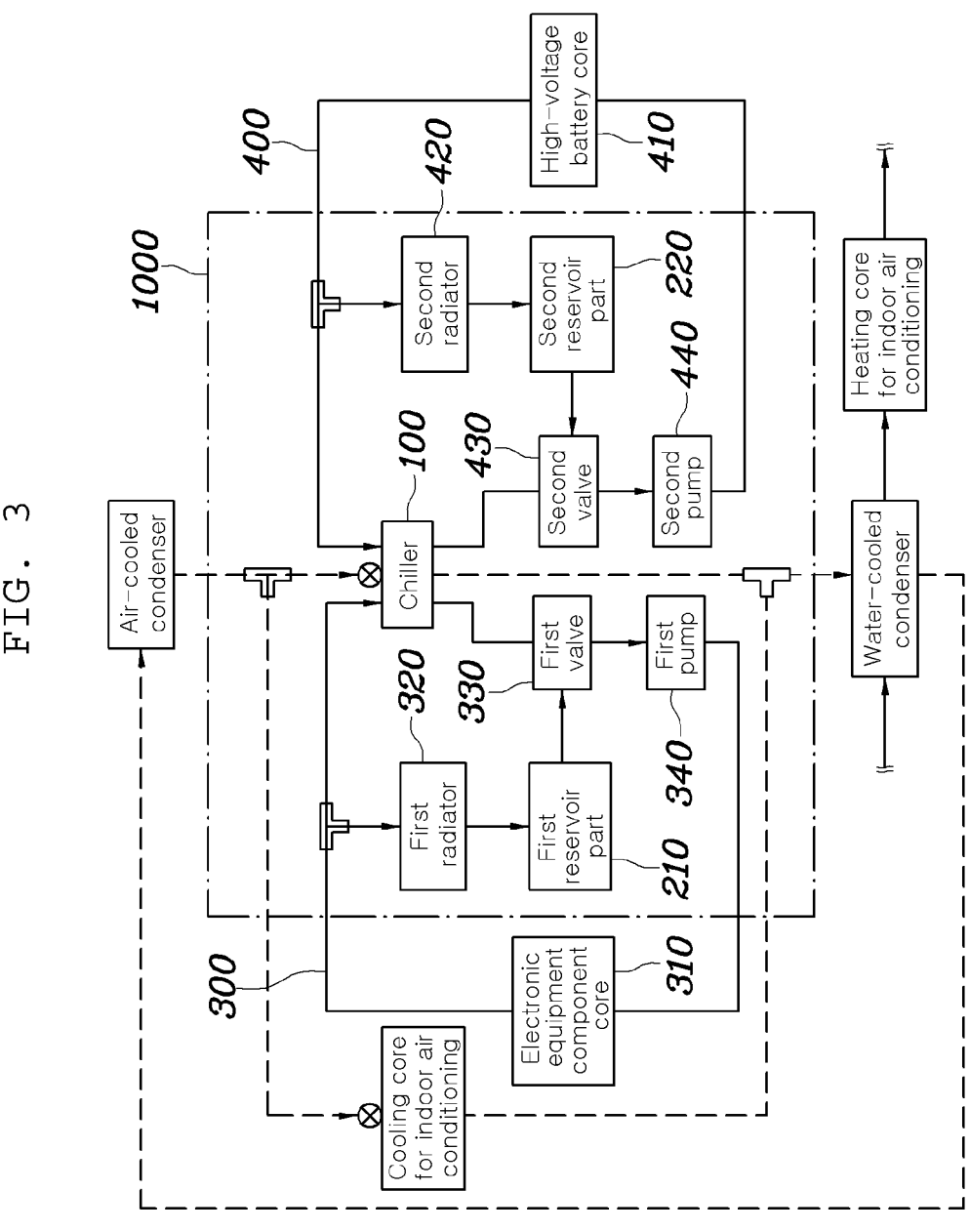
FIG. 3 illustrates a heat management circuit of the integrated heat management module including a reservoir tank for integrated heat management according to an embodiment of the present disclosure.

FIG. 3 illustrates a heat management circuit of an integrated heat management module 1000 including a reservoir tank 200 for integrated heat management according to an embodiment of the present disclosure.

Referring to FIG. 3, the integrated heat management module 1000 including a reservoir tank 200 for integrated heat management according to an embodiment of the present disclosure may further include: a chiller 100 coupled directly or indirectly so as to be integrally connected to the reservoir tank 200 such that refrigerant and cooling water, which flow in/out of the same, respectively, exchange heat with each other; a first pump 340 connected to the first discharge opening 212 through which cooling water is discharged from the first reservoir part 210 so as to circulate cooling water through the electronic equipment component line 300; a first valve 330 configured to adjust cooling water in the first reservoir part 210 and cooling water that has passed through the chiller 100 so as to selectively flow into the first pump 340; a second pump 440 connected to the second discharge opening 222 through which cooling water is discharged from the second reservoir part 220 so as to circulate cooling water through the battery line 400; and a second valve 430 configured to adjust cooling water in the second reservoir part 220 and cooling water that has passed through the chiller 100 so as to selectively flow into the second pump 440.

Vehicles are equipped with various kinds of heating devices, such as electronic equipment components including motors and inverters, high-voltage batteries, and vehicle indoor air-conditioning devices. These need to be managed in different temperature ranges, and this may be implemented independently because of different operating timepoints.

The electronic equipment component line 300 may have cooling water flowing therein separately from the battery line 400, and may be connected to an electronic equipment component core 310 so as to cool an electronic equipment component through heat exchange with the electronic equipment component. The first cooling water line may be connected to the electronic equipment component line 300 such that cooling water flows in from and is discharged to the electronic equipment component line 300.

The battery line 400 may have cooling water flowing therein, and may be connected to a high-voltage battery core 410 so as to cool a high-voltage battery through heat exchange with the high-voltage battery. The second cooling water line may be connected to the battery line 400 such that cooling water flows in from and is discharged to the battery line 400.

The chiller 100 may be coupled directly or indirectly so as to be integrally connected to the reservoir tank 200. The chiller 100 may be positioned adjacent to the reservoir tank 200 and fixed to the reservoir tank 200. Valves and pumps (described later) may be positioned below the reservoir tank 200 and the chiller 100.

The first inflow opening 211 of the first reservoir part 210 may be connected to the exit of a first radiator 320 through which part or all of cooling water that has passed through the electronic equipment component core 310 is introduced, and the second inflow opening 221 of the second reservoir part 220 may be connected to the exit of a second radiator 420 through which part or all of cooling water that has passed through the high-voltage battery core 410 is introduced.

That is, cooling water cooled by the first radiator 320 may flow into the first reservoir part 210, and cooling water may be discharged from the first reservoir part 210 to the first valve 330. Cooling water cooled by the second radiator 420 may flow into the second reservoir part 220, and cooling water may be discharged from the second reservoir part 220 to the second valve 430.

The first valve 330 may adjust cooling water in the chiller 100 and cooling water in the first reservoir part 210 so as to be selectively introduced into the electronic equipment component core 310. Particularly, the first valve 330 may be a 3-way valve and may selectively introduce cooling water discharged from the chiller 100 and cooling water discharged from the first reservoir part 210 into the electronic equipment component core 310 of the electronic equipment component line 300.

The second valve 430 may adjust cooling water in the chiller 100 and cooling water in the second reservoir part 220 so as to be selectively introduced into the high-voltage battery core 410. Particularly, the second valve 430 may be a 3-way valve and may selectively introduce cooling water discharged from the chiller 100 and cooling water discharged from the second reservoir part 220 into the highvoltage battery core 410 of the battery line 400.

The first valve 330 and the second valve 430 may be controlled to be opened/closed by a separately provided actuator. The actuator may control the first valve 330 or the second valve 430 according to a command from a controller 800. The same may be controlled by the first pump 340 and the second pump 40 or by the controller 800.

The first pump 340 may circulate cooling water through the electronic equipment component line 300 such that cooling water selectively introduced from the chiller 100 or from the first reservoir part 210 through the rear end of the first valve 330 flows into the electronic equipment component core 310.

The second pump 440 may circulate cooling water through the battery line 400 such that cooling water selectively introduced from the second cooling water line or from the second reservoir part 220 through the rear end of the second valve 430 flows into the high-voltage battery core 410.

In an embodiment, the chiller 100 may be formed such that cooling water flows therein from the electronic equipment component line 300 and from the battery line 400, and the flow of cooling water is separated from each other. Refrigerant may be connected to be able to exchange heat both with cooling water in the electronic equipment component line 300 and cooling water in the battery line 400, which are separate from each other.

Particularly, the chiller 100 may include a first cooling water line, a second cooling water line, and a refrigerant heating line. The refrigerant heating line may be connected so as to exchange heat with at least one of the first cooling water line and the second cooling water line. The first cooling water line may be connected to the electronic equipment component line 300, and the second cooling water line may be connected to the battery line 400.

This is advantageous in that refrigerant is heated by using waste heat from cooling water heated by the high-voltage battery or electronic equipment component, thereby improving overall energy efficiency of the integrated cooling circuit.

The refrigerant heating line may be connected to a refrigerant flow line in which refrigerant flows, and the refrigerant flow line may be connected so as to exchange heat with an air-conditioning cooling line. The air-conditioning cooling line may have cooling water flowing therein, and may be connected to a heating core for indoor air conditioning. Air heated while passing through the heating core for indoor air conditioning may flow into the vehicle indoor space through air blower.

Figure 4:
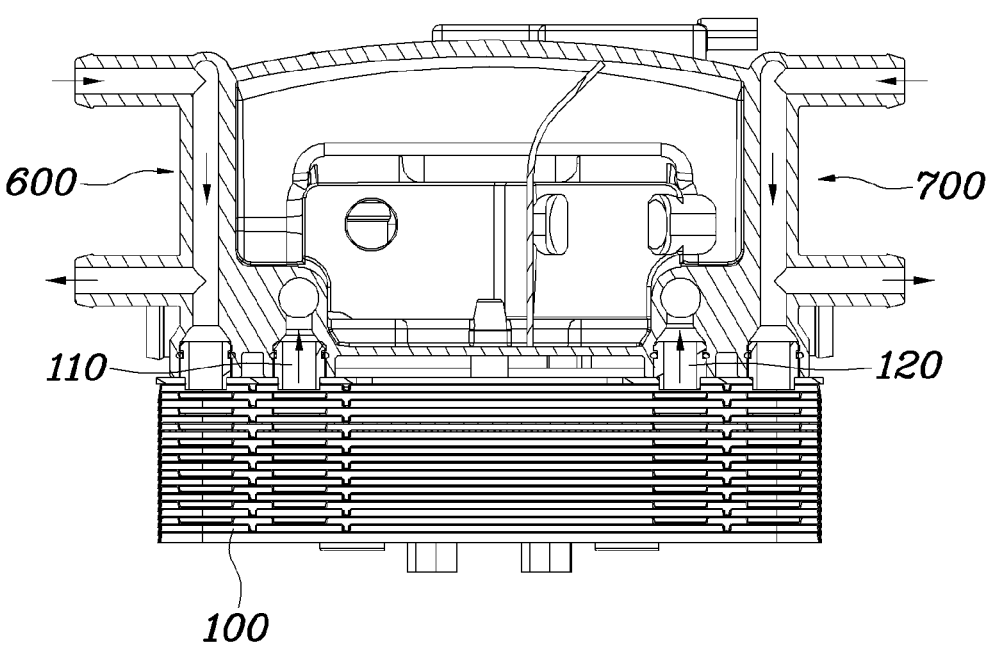
FIG. 4 is a B-B sectional view of the integrated heat management module according to an embodiment of the present disclosure.

FIG. 4 is a B-B sectional view of the integrated heat management module according to an embodiment of the present disclosure.

Referring to FIG. 4, the module may further include a first branch tube 600 branching off between the first radiator 320 and the chiller 100 such that cooling water in the electronic equipment component line 300, which has passed through the electronic equipment component core 310, flows therein, and a second branch tube 700 branching off between the second radiator 420 and the chiller 100 such that cooling water in the battery line 400, which has passed through the high-voltage battery core 410, flows therein. The first branch tube 600 and the second branch tube 700 may be integrally coupled to the chiller 100 or the reservoir tank 200.

The first branch tube 600 and the second branch tube 700 may discharge branch flows of cooling water flowing in from the electronic equipment component line 300 the battery line 400, respectively. Particularly, the first branch tube 600 and the second branch tube 700 may vary the direction in which cooling water flows therein by adjusting the degree of opening of the first valve 330 and the second valve 430, respectively.

The first branch tube 600 may cause cooling water heated through the electronic equipment component core 310 so as to branch off between the first radiator 320 and the chiller 100. The second branch tube 700 may cause cooling water heated through the high-voltage battery core 410 so as to branch off between the second radiator 420 and the chiller 100.

Particularly, both the first branch tube 600 and the second branch tube 700 may be integrally coupled to the reservoir tank 200 or to the chiller 100. This is advantageous in that manufacturing costs can be reduced by reducing the number of components, while providing packaging efficiency.

The module may further include a first discharge line 110 extending between the chiller 100 and the first valve 330 such that cooling water discharged from the chiller 100 into the electronic equipment component line 300 flows into the first valve 330, and a second discharge line 120 extending between the chiller 100 and the second valve 430 such that cooling water discharged from the chiller 100 into the battery line 400 flows into the second valve 430. The first discharge line 110 and the second discharge line 120 may be integrally coupled to the chiller 100 or to the reservoir tank 200.

Figure 5:
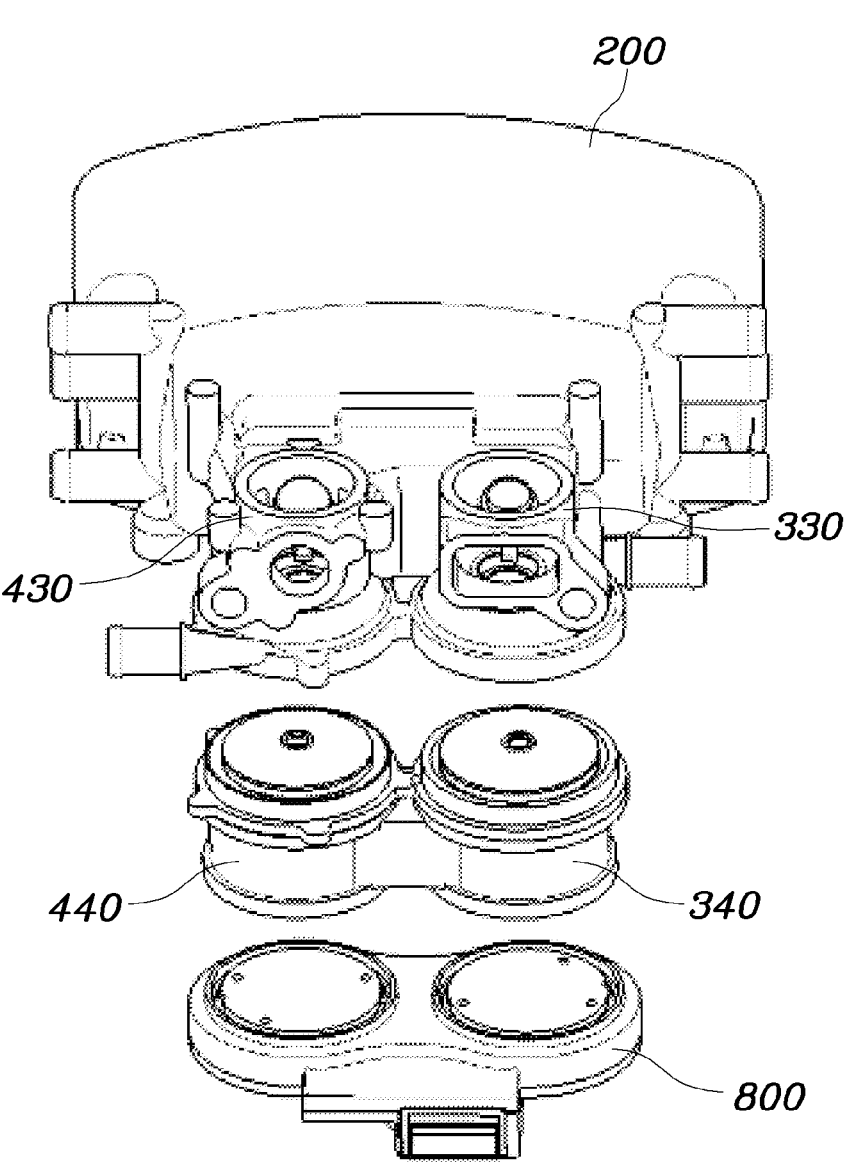
FIG. 5 is an exploded perspective view of first and second pumps of the integrated heat management module according to an embodiment of the present disclosure.

FIG. 5 is an exploded perspective view of the first and second pumps of the integrated heat management module according to an embodiment of the present disclosure.

Referring to FIG. 5, the first pump 340 and the second pump 440 may be integrally coupled to the chiller 100 or to the reservoir tank 200, and the direction in which the first pump 340 rotates during driving may be opposite to the direction in which the second pump 440 rotates during driving.

The first pump 340 and the second pump 440 may be integrally coupled to the reservoir tank 200 or to the chiller 100. The first pump 340 and the second pump 440 may be integrally coupled to the first valve 330 and the second valve 430 as well.

In an embodiment, assuming that the first pump 340 rotates clockwise during driving, the second pump 440 may rotate in the opposite direction (counterclockwise).

In another embodiment, the first pump 340 and the second pump 440 may be disposed such that the axis of rotation of the first pump 340 and the axis of rotation of the second pump 440 are deviated from or perpendicular to each other.

Accordingly, when the first pump 340 and the second pump 440 operate simultaneously, vibrations caused by rotations in the above-directions counterbalance each other, thereby improving vibration performance. This is also advantageous in that the same are integrally coupled to the reservoir tank 200 and the chiller 100, thereby increasing the mass, such that the vibration performance is improved when operating individually.

The module may further include a controller 800 integrally coupled to the first pump 340 and the second pump 440 so as to control driving of the first pump 340 and driving of the second pump 440 together. Additionally, the controller 800 may control an actuator for driving the first valve 330 and the second valve 430.

The controller 800 may be integrally coupled to the first pump 340 and the second pump 440 so as to control the first pump 340 and the second pump 440. Particularly, the controller 800 may communicate with a motor control unit (MCU), a battery management system (BMS), an electronic equipment component control unit, or an electronic control unit (ECU) of the vehicle, thereby controlling the driving of the first pump 340 and the second pump 440.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

BRIEF DESCRIPTION OF REFERENCE NUMERALS

100: chiller
200: reservoir tank
210: first reservoir part
220: second reservoir part
230: injection opening
240: separator barrier
250: injection barrier
300: electronic equipment component line
400: battery line
500: refrigerant flow line
600: first branch tube
700: second branch tube
800: controller

What is claimed is:

1. An integrated heat management module comprising: a reservoir tank comprising,
   a first reservoir part connected to an electronic equipment component line connected to an electronic equipment component core such that cooling water flowing into/out of the electronic equipment component line is stored in the first reservoir part; and
   a second reservoir part connected to a battery line connected to a high-voltage battery core such that cooling water flowing into/out of the battery line is stored in the second reservoir part separately from the cooling water stored in the first reservoir part,
   a chiller directly or indirectly coupled so as to be integrally connected to the reservoir tank such that refrigerant and cooling water, which flow in/out, respectively, exchange heat with each other;
   a first pump connected to a first discharge opening through which cooling water is discharged from the first reservoir part so as to circulate cooling water through the electronic equipment component line;
   a first valve configured to adjust cooling water in the first reservoir part and cooling water that has passed through the chiller so as to selectively flow into the first pump;
   a second pump connected to a second discharge opening through which cooling water is discharged from the second reservoir part so as to circulate cooling water through the battery line; and
   a second valve configured to adjust cooling water in the second reservoir part and cooling water that has passed through the chiller so as to selectively flow into the second pump.

2. The integrated heat management module of claim 1, further comprising a separator barrier extending upwards from a lower surface of the reservoir tank between the first reservoir part and the second reservoir part so as to delimit the first reservoir part and the second reservoir part.

3. The integrated heat management module of claim 1, further comprising an injection barrier formed in the first reservoir part or the second reservoir part so as to extend along a plane parallel to the ground.

4. The integrated heat management module of claim 3, wherein the first reservoir part and the second reservoir part communicate with each other in an upper portion of the injection barrier, and a through-hole is formed through the injection barrier such that the upper portion and a lower portion of the injection barrier communicate with each other.

5. The integrated heat management module of claim 1, further comprising an injection opening formed through a wall of the reservoir tank such that the first reservoir part and the second reservoir part communicate with each other in an upper portion thereof, and such that an inside of the first reservoir part and the second reservoir part communicates with an outside.

6. The integrated heat management module of claim 3, wherein the first reservoir part has a first inflow opening formed such that cooling water flows in from the electronic equipment component line and has a first discharge opening formed such that cooling water therein is discharged to the electronic equipment component line, the first inflow opening is positioned in a lower portion of the injection barrier, and the first discharge opening is positioned relatively lower than the first inflow opening.

7. The integrated heat management module of claim 3, wherein the second reservoir part has a second inflow opening formed such that cooling water flows in from the battery line and has a second discharge opening formed such that cooling water therein is discharged to the battery line, the second inflow opening is positioned in a lower portion of the injection barrier, and the second discharge opening is positioned relatively lower than the second inflow opening.

8. The integrated heat management module of claim 1, wherein the chiller is formed such that cooling water flows therein from the electronic equipment component line and cooling water flows therein from the battery line while being separated from each other.

9. The integrated heat management module of claim 1, further comprising:
   a first branch tube branching off between a first radiator and the chiller such that cooling water flows in from the electronic equipment component line after passing through an electronic equipment core; and
   a second branch tube branching off between a second radiator and the chiller such that cooling water flows in from the battery line after passing through a high-voltage battery core,
   wherein the first branch tube and the second branch tube are integrally coupled to the chiller or the reservoir tank.

10. The integrated heat management module of claim 1, further comprising:
   a first discharge line extending between the chiller and the first valve such that cooling water in the electronic equipment component line, discharged from the chiller, flows into the first valve; and
   a second discharge line extending between the chiller and the second valve such that cooling water in the battery line, discharged from the chiller, flows into the second valve,
   wherein the first discharge line and the second discharge line are integrally coupled to the chiller or the reservoir tank.

11. The integrated heat management module of claim 1, wherein the first pump and the second pump are integrally coupled to the chiller or the reservoir tank, and the direction in which the first pump rotates during driving is opposite to the direction in which the second pump rotates during driving.

* * * * *